(12) United States Patent
Howard

(10) Patent No.: US 12,434,792 B2
(45) Date of Patent: Oct. 7, 2025

(54) MADWATER HINGE

(71) Applicant: Thomas Leo Howard, Barnett, MO (US)

(72) Inventor: Thomas Leo Howard, Barnett, MO (US)

( * ) Notice: Subject to any disclaimer, the term of this patent is extended or adjusted under 35 U.S.C. 154(b) by 1142 days.

(21) Appl. No.: 17/356,247

(22) Filed: Jun. 23, 2021

(65) Prior Publication Data
US 2022/0411027 A1    Dec. 29, 2022

(51) Int. Cl.
*B63B 27/14*    (2006.01)
*E05D 3/02*    (2006.01)

(52) U.S. Cl.
CPC ............ *B63B 27/143* (2013.01); *E05D 3/022* (2013.01)

(58) Field of Classification Search
CPC ... B65G 69/2811; B63B 35/36; B63B 27/143; B63C 1/02; E01D 15/14; E01D 15/24; E01D 15/124; E02B 3/064; F16C 35/047
See application file for complete search history.

(56) References Cited

U.S. PATENT DOCUMENTS

| | | | | | |
|---|---|---|---|---|---|
| 2,695,201 | A | * | 11/1954 | Leister | F16C 35/047 384/536 |
| 4,581,784 | A | * | 4/1986 | Rousseau | E01D 15/24 114/263 |
| 4,804,298 | A | * | 2/1989 | Nasby, Jr. | E02B 3/068 405/218 |
| 5,529,012 | A | * | 6/1996 | Rytand | B63C 1/02 114/263 |
| 6,890,120 | B2 | * | 5/2005 | Hozie | B63B 35/36 403/53 |
| 7,290,310 | B2 | * | 11/2007 | Yamaguchi | E05D 5/10 16/234 |
| 7,341,016 | B2 | * | 3/2008 | Terleski | B63B 27/143 114/343 |
| 8,136,468 | B2 | * | 3/2012 | Rytand | E02B 3/064 114/263 |
| 8,596,211 | B2 | * | 12/2013 | Ramey | B63B 21/26 114/344 |
| 8,851,798 | B1 | * | 10/2014 | Jaycox | B63B 35/38 114/353 |

(Continued)

FOREIGN PATENT DOCUMENTS

CN    209506012 U * 10/2019
FR    2121919 A5 * 8/1972

*Primary Examiner* — Jonathan P Masinick
(74) *Attorney, Agent, or Firm* — Polsinelli LLP

(57) ABSTRACT

The present disclosure is directed to an apparatus that flexibly couples a ramp to a boat dock and to methods for constructing this apparatus. These methods may also include steps directed to selecting material strengths or sizes when designing an assembly that attaches the ramp to the boat dock. By allowing relative up-down motion between a boat dock and a ramp using materials with particular characteristics, apparatus built in a manner consistent with the present disclosure are much stronger than conventional apparatus that connect a ramp to a boat dock. Apparatus consistent with the present disclosure prevent property damage, personal injury, and death that are commonly associated with conventional boat ramps and docks. Apparatus of the present disclosure increase the safety of boat docks and increase the robustness of connection points where a ramp meets a boat dock.

9 Claims, 4 Drawing Sheets

(56) References Cited

U.S. PATENT DOCUMENTS

| | | | |
|---|---|---|---|
| 9,856,618 B2* | 1/2018 | Hawkins, III | E04B 1/19 |
| 10,704,218 B2* | 7/2020 | Assinck | B63C 1/02 |
| 2008/0313826 A1* | 12/2008 | Kloppenburg | B65G 69/2811 |
| | | | 14/71.1 |
| 2015/0361629 A1* | 12/2015 | Hawkins | E04B 1/1903 |
| | | | 405/220 |
| 2019/0242084 A1* | 8/2019 | Assinck | E02B 3/16 |

* cited by examiner

MADWATER HINGE

BACKGROUND OF THE INVENTION

Field of Invention

The present disclosure generally relates to an improved maritime ramp-dock coupling device. More specifically, the present disclosure relates to increasing the safety of a boat dock & ramp.

Description of the Related Art

Boat docks are commonly located adjacent to the shore of a lake or other waterway. Commonly boat docks are attached to a ramp that rests on the ground and individual who wish to access the dock must walk or ride on a vehicle from dry land up the ramp to access the dock. Since these ramps have one end that rests on the ground or other fixed point and since boat docks are commonly free to rise and fall based on movement of water upon which the docks rest, there is relative movement is at a point where the dock and ramp meet.

Various factors affect the longevity and safety of a boat dock, especially at a point where the boat dock meets a ramp. Waves, tidal action, and other rough water conditions commonly damage the structural integrity or framing of a dock. Stress from relative movement between a ramp and a dock commonly cause hardware that attaches the ramp and to dock to break. Frequently, boat docks and ramps are connected using a simple two bolt hinge that is commonly referred to as a "dog ear" hinge. Commonly bolts that connect a ramp to a dock break due to sheer stress that wears the bolts each time there is relative motion between the dock and the ramp. Hinges conventionally used to allow relative motion between a ramp and a dock are not suited to prevent wearing of the bolts and failure of the boat dock. Frequently, the construction methods used to connect a ramp to a dock cause damage, personal injury, or death.

Commonly, electrical power lines are run along a portion of a ramp to a boat dock. These power lines are used to distribute electrical power to boats when they are moored at the dock. These power lines often provide high voltage alternating current (AC) voltages to the boat dock. Voltages commonly used include 110 volt AC, 220 volt AC, and/or 440 volt AC. Such voltages can easily shock and kill persons or animals.

Failure at point that connects a ramp to a boat dock can cause damage, personal injury, or death for various different reasons. The breaking of the bolts can cause a ramp to fall or move in an inappropriate direction relative to a boat dock. Such inappropriate movements can damage the structural integrity of a boat dock and the ramp, can result in framing of the dock to crack or buckle, and can break electrical power lines. If inappropriate motion occurs when a person is on or near the ramp, that person could be injured because of a fall or because a portion of the ramp or boat dock impacts or crushes the person. Furthermore, an electrical power line loose on a surface or that contacts the water can shock a person to death.

What are needed are new apparatus and methods for making boat docks and their associated ramps stronger and safer.

SUMMARY OF THE CLAIMED INVENTION

The presently claimed invention relates to an apparatus for coupling a ramp to a dock. The presently claimed invention also relates to a method making the apparatus that couples a ramp to a dock. In a first embodiment, the apparatus may include a first receiver plate, a first set of pillow block bearings, a second receiver plate, a second set of pillow block bearings, and an elongated bar shaped structure. This apparatus may include two different receiver plate sub-assemblies, where a first receiver plate sub-assembly includes the first receiver plate that is rigidly coupled to the first set of pillow block bearings. A second receive plate sub-assembly may include the second receiver plate that is rigidly coupled to the second set of pillow block bearings. These two different sub-assemblies may be connected by the elongated bar shaped structure based on this bar shaped structure having been passed through the first set and the second set of pillow block bearings.

In a second embodiment, the presently claimed invention may be a method that includes rigidly coupling a first receiver plate to a first set of pillow block bearings to form a first receiver plate sub-assembly, rigidly coupling a second receiver plate to a second set of pillow block bearings to form a second receiver plate sub-assembly, and connecting the first receiver plate sub-assembly to the second receiver plate sub-assembly by passing an elongated bar through the first set and the second set of pillow block bearings.

DETAILED DESCRIPTION

The present disclosure is directed to an apparatus that flexibly couples a ramp to a boat dock and to methods for constructing this apparatus. These methods may also include steps directed to selecting material strengths or sizes when designing an assembly that attaches the ramp to the boat dock. By allowing relative up-down motion between a boat dock and a ramp using materials with particular characteristics, apparatus built in a manner consistent with the present disclosure are much stronger than conventional apparatus that connect a ramp to a boat dock. Apparatus consistent with the present disclosure prevent property damage, personal injury, and death that are commonly associated with conventional boat ramps and docks. Apparatus of the present disclosure increase the safety of boat docks and increase the robustness of connection points where a ramp meets a boat dock. Apparatus of the present disclosure allow for relative movement between a boat dock and a ramp in ways that help prevent stress from being transmitted to hardware that attaches the ramp to the boat dock.

Figure 1A:
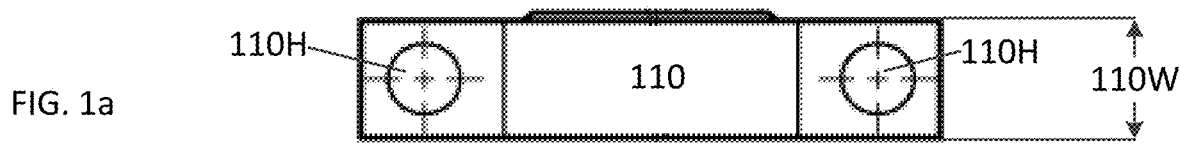
FIGS. 1a-1c illustrate components that may be used in an assembly that connects a ramp to a boat dock.
Figure 1B:
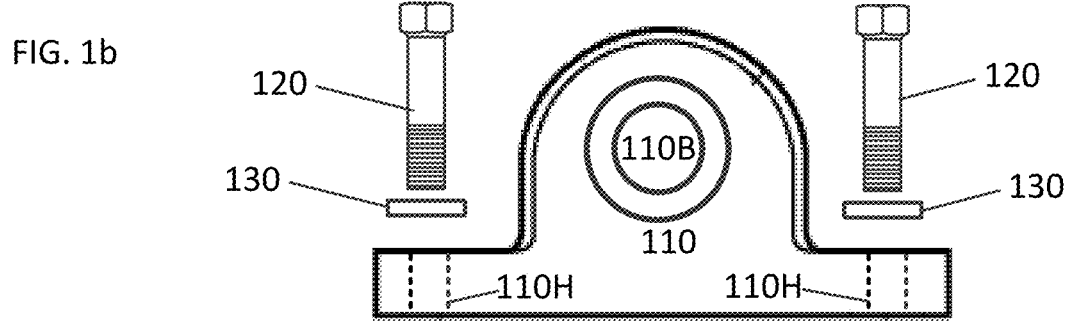
Figure 1B:
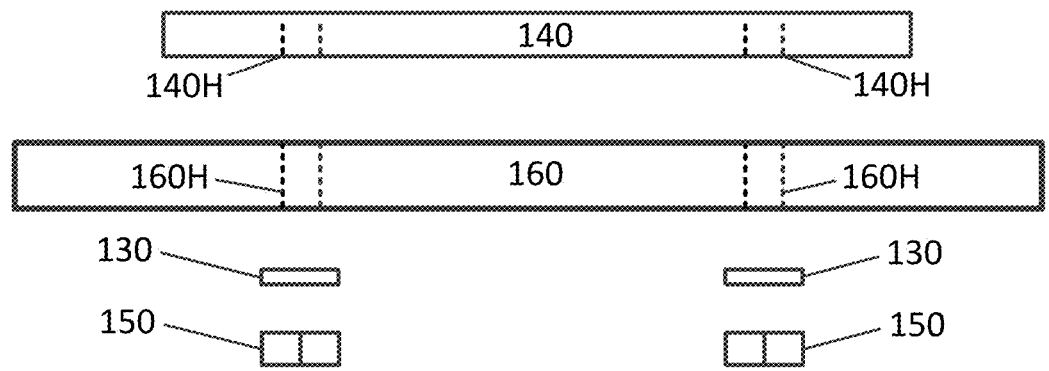
Figure 1C:
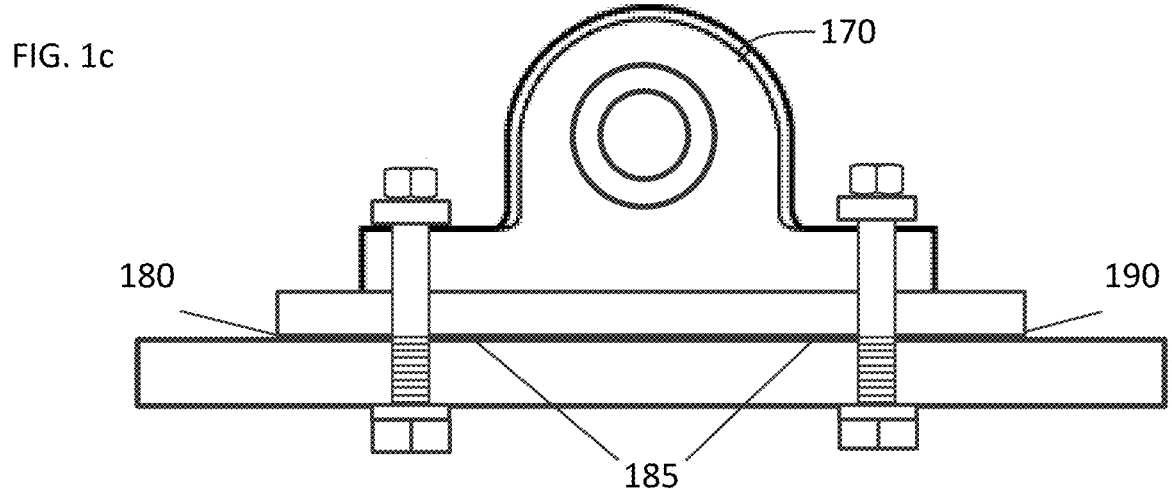

FIGS. 1a-1c illustrate components that may be used in an assembly that connects a ramp to a boat dock. FIG. 1a illustrates a bottom view of pillow block ball bearing 110, spacing plate/bearing rest 140, and receiver/mounting plate 160. FIG. 1b illustrates a side view including bolts 120, washers 130, and nuts 150 that may be used to couple the various components of FIG. 1b together. The side view of pillow block bearing 110 includes a center portion 110B where a hole and a bearing portion of pillow block bearing 110 is located.

Different sets of holes (110H, 140H, & 160H) in different parts (pillow block bearing 110, spacing plate 140, & receiver plate 160) of FIG. 1b are illustrated with dashed lines as indicators of a semi-cross-sectional-view of these holes. Note that pillow block bearing 110 includes holes 110H that are shown in both the side view and the bottom view of pillow block bearing 110, where the side view shows the holes as dashed lines in a semi-cross-sectional-view and where the bottom view shows the holes as circles. Similarly, holes 140H and 160H respectively in spacing plate/bearing rest 140 and in receiver plate 160 are illustrated using dashed lines. The various holes 110H, 140H, and 160H of FIG. 1b may be locations where bolts 120 pass through when sub-assembly 170 is made. Mounting hardware including bolts 120, washers 130, and nuts 150 may be used to help secure the various parts of FIG. 1b together.

FIG. 1c illustrates a side view including welds 180, 185, and 190 as being part of sub-assembly 170. The process of making sub-assembly 170 may include aligning spacing plate/bearing rest 140 with receiver plate 160 and welding this spacing plate 140 and receiver plate 160 together at various points when sub-assembly is fabricated. While FIG. 1c shows that spacing plate 140 being located in a center portion of receiver plate 160 (i.e. not extending from one edge of receiver plate 160 to another) in practice spacing plate 140 may have a length that extends along a total width of receiver plate 160. Since pillow block bearing 110 will typically rest on spacing plate 140, spacing plate 140 may be referred to as bearing rest 140. Typically spacing plate 140 will have a width that is the same as or wider than a width 110W of pillow block bearing 110.

After the spacing plate 140 and receiver plate 160 are welded together, pillow block bearing may be attached using bolts 120, washers 130, and nuts 150. Alternatively, spacing plate 140, receiver plate 160, and pillow block bearing 110 may be connected together using the mounting hardware illustrated in FIG. 1c or by other mounting hardware after which different parts of FIG. 1c may be welded together. While typically pillow block bearing 110 will not be welded to spacing plate 140, in certain instances pillow block bearing may be held in place using welds.

While in certain instances spacing plate 140 and receiver plate may be welded together, in other instances each of the items of assembly may be held together using only mounting hardware. In yet other instances, spacing plate 140 may be eliminated entirely and pillow block 110 may be mounted to receiver plate 160 using mounting hardware, welds, or both.

Figure 2:
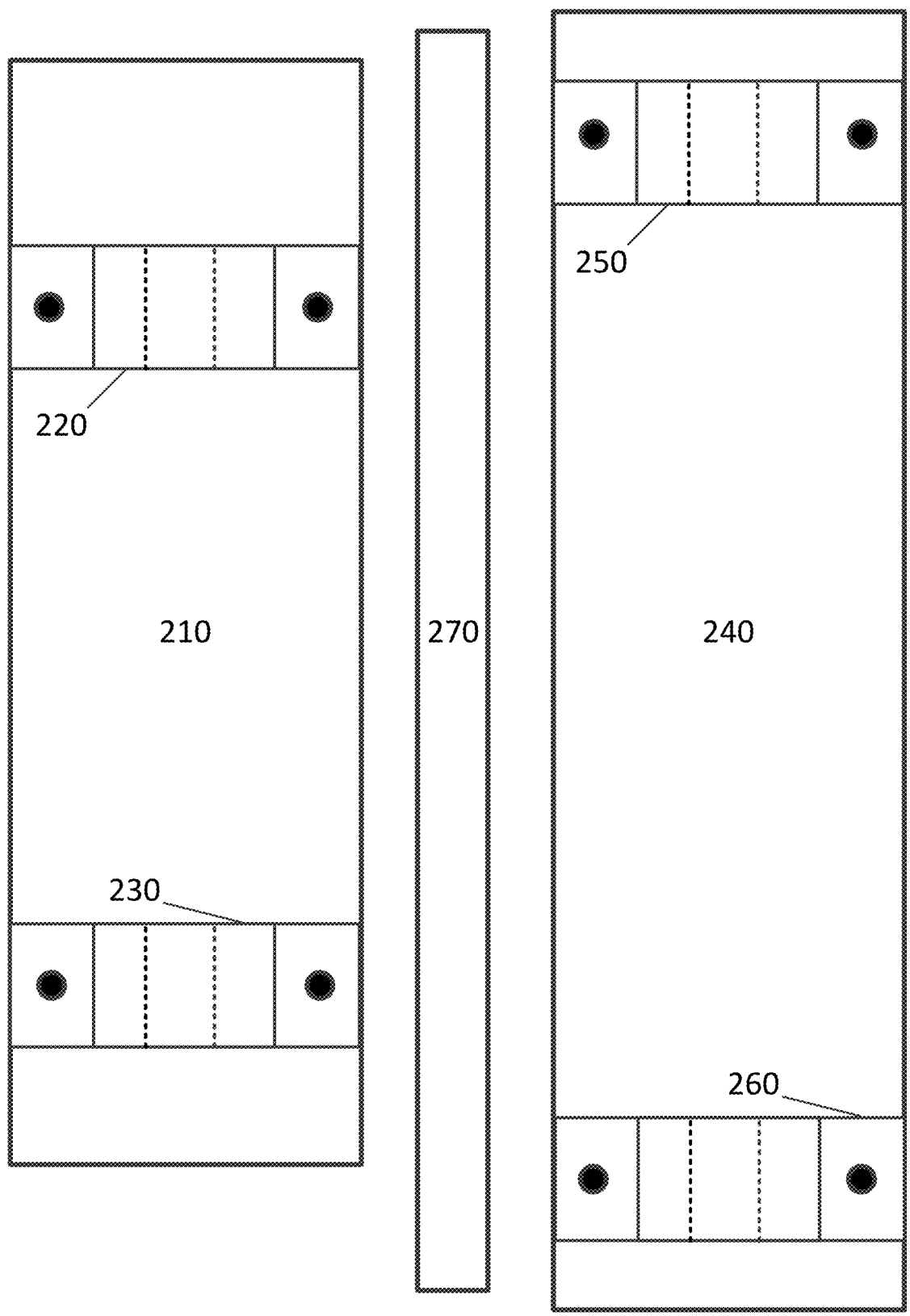
FIG. 2 illustrates a series of parts that when assembled from an assembly that may flexibly connect a marine dock to a ramp.

A thickness of spacing plate 140 may be adjusted, a thickness of receiver plate 160 may be adjusted, or both thickness of spacing plate 160 and receiver plate 160 may be adjusted. The adjustments of these various thickness allow a designer to adjust a maximum amount of rotation or relative motion between a boat dock and a ramp. These adjustments may allow the designer to use longer ramps or may allow for an apparatus consistent with the present disclosure to adjust to varying water levels. Varying water levels may cause a designer to use a longer ramp or to adjust a relative position of pillow block bearing 110 based on ramp or boat dock constraints. Various things may cause water levels to vary or change, a water level may rise of fall with wave action, changes in tide, or changes in an amount of water stored in a reservoir FIG. 2 illustrates a series of parts that when assembled from an assembly that may flexibly connect a marine dock to a ramp. FIG. 2 includes a first receiver/mounting plate 210, a second receiver plate 240, a tube or bar 270, and four different pillow block bearings (220, 230, 250, & 260). Pillow block bearings 220 and 230 may be attached to receiver plate 210 using mounting hardware that may include the nuts, bolts, and washers illustrated in FIGS. 1a-1c. The black circles of pillow block bearings 220 & 230 are holes that may be used to attach pillow bock bearings 220 & 230 to receiver plate 210.

Pillow block bearings 250 and 260 may be attached to receiver plate 240 using mounting hardware that may include the nuts, bolts, and washers illustrated in FIGS. 1a-1c. The black circles of pillow block bearings 250 & 260 are holes that may be used to attach pillow bock bearings 250 & 260 to receiver plate 240. While not show in FIG. 2, each of the different pillow block bearings of FIG. 2 may be mounted onto different respective spacing plates (or bearing rests) like those of FIGS. 1a-1c. These spacing plates may be welded onto a respective receiver plate.

FIG. 2 also includes tube or bar 270 that may be used to connect a first sub-assembly that includes receiver plate 210 and pillow block bearings 220 & 230 to a second sub-assembly that includes receiver plate 240 and pillow block bearings 250 & 260. Note that each of the pillow block bearings (220, 230, 250, & 260) include dashed lines, these dashed lines represent locations where a circular shaped bearing assembly resides in the different pillow block bearings of FIG. 2. These bearings may allow circular tube or bar 270 to pass through the respective pillow block bearings of FIG. 2. This process may include: aligning pillow block bearings of the first aforementioned sub-assembly with the pillow block bearings of the second aforementioned sub-assembly and then by passing tube or bar 270 respectively through pillow block bearing 260, pillow block bearing 230, pillow block bearing 220, and pillow block bearing 250 when a receiver plate assembly is made. Before passing the tube or rod through the pillow block bearings, the tube or rod may be lubricated with a grease or food grade lubricant.

Note that tube or bar 270 may be made of a high quality steel such as stainless steel. Such a tube may be a cold rolled stainless steel, for example. The use of a cold rolled stainless steel tube to connect respective receiver plate sub-assemblies has several advantages. Such advantages include high strength, corrosion resistance, light weight, and reasonable cost as compared to using a solid bar or hot rolled metal tubes. Even so, any suitably strong tube or bar may be used in apparatus consistent with the present disclosure. Such tubes or bars by being round and by fitting within sets of pillow block bearings would allow different respective receiver plate sub-assemblies to rotate around a tube or bar.

After a receiver plate assembly has been assembled, different ends of a connecting tube may be flared in order to prevent the tube from moving in a lateral direction. This would help prevent the tube from sliding out of or being slid out of the receiver plate assembly. Alternatively, or additionally other mechanisms could be used to prevent or resist lateral movement of a tube or bar of a receiver plate assembly. For example, clamps such as a stainless steel band clamp could be place around the tube or bar to prevent lateral movement of the tube or bar. Such a tube or bar may also be lubricated with a grease or other lubricant to allow for easier assembly or to help mitigate corrosion. Food grade kitchen greases may be used to lubricate such tubes or rods in order to keep contaminates from being introduced into the environment.

While tube or bar 270 will typically have a round shape that fits into a circular set of bearings of several pillow block bearings, apparatus consistent with the present disclosure are not limited to using round shaped bars. Alternative embodiments could be built using bars that have a square shape that fit into pillow block bearings adapted to receive such a square shape. Tube or bar 270 of FIG. 2 is an elongated bar shaped structure that is long enough to fit through pillow block bearings 250, 220, 230, and 260 when the two different receiver plate sub-assemblies and are connected. For clarity, a first receiver plate sub-assembly of FIG. 2 includes receiver plate 210 and pillow block bearings 220 & 230; and a second receiver plate sub-assembly of FIG. 2 includes receiver plate 240 and pillow block bearings 250 & 260. A round or other shape associated with tube or bar 270 is a shape associated with a cross-section or end view of tube or bar 270 along an axis that is perpendicular to a length of tube or bar 270.

While not illustrated in FIG. 2, receiver plates 210 & 240 may each include numerous holes where bolts may be passed when the receiver plates are assembled onto a ramp or dock. In such an instance mounting bolts may pass through a ramp and a ramp receiver plate to connect the ramp to the ramp receiver plate. Additionally, mounting bolts may be passed through a portion of a boat dock and a dock receiver plate to connect the dock receiver plate to the dock. In certain instances, the bolts of FIGS. 1a-1c used to connect pillow block bearings to a receiver plate may also be used to connect a receiver plate sub-assembly to a ramp or a dock.

The assembly of two different receiver plate sub-assemblies connected together with an elongated bar shaped structure passed though sets of pillow block bearings allows the first and the second receiver plate sub-assemblies to rotate in a direction that is perpendicular to a length of the elongated bar shaped structure (i.e. in a direction that rotates around a width or cross-section of the elongated bar). This assembly also inherently limits relative movement of the different pillow block sub-assemblies along the length of the bar as forces that could affect such motion would have to be directly along the length of the bar. Forces not directly along the length of the bar would cause resistance to relative motion along the bar as torsional stresses will tend to resist motion along the length of the bar. Despite this, assemblies consistent with the present disclosure may also include clamps or use flared portions located at the ends of the bar that will further limit or eliminate relative motion of two receiver plates along the bar (as discussed above). What this means is that the present assembly would allow a ramp to flexibly move up and down relative to a dock while resisting or eliminating motion in a left to right direction as water levels vary instantaneously or over time.

Figure 3:
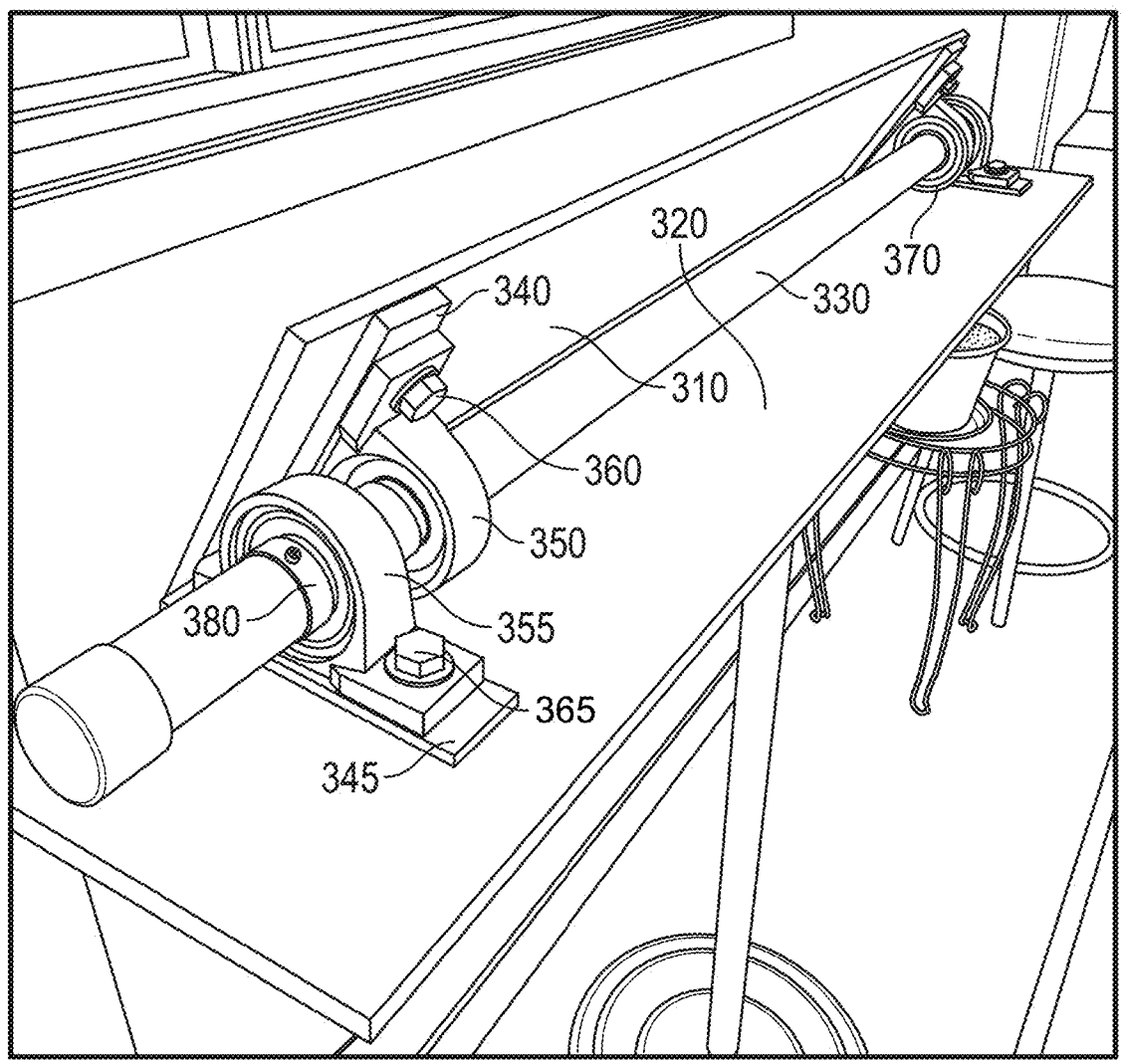
FIG. 3 illustrates a receiver plate assembly that may be installed to flexibly join a boat ramp to a boat dock.

FIG. 3 illustrates a receiver plate assembly that may be installed to flexibly join a boat ramp to a boat dock. FIGS. 1a-1c includes a first receiver plate 310 that may be attached to a ramp and a second receiver plate that may be attached to a boat dock. FIG. 3 includes tube or bar 360 that attaches receiver plate 310 and 320 via several pillow block bearing sub-assemblies two of which are located on the left side of FIG. 3 and a similar set of pillow block sub-assemblies on the right side of FIG. 3.

Note that pillow block bearing 355 rests on spacing plate 345 and bolt 365 is used to attach pillow block bearing 345 to receiver plate 320. As illustrated in FIGS. 1a-1c, each respective pillow block bearing may be held in place with two bolts and respective spacing plates may be welded onto a respective receiver plate. Similarly, pillow block bearing 350 rests on spacing plate 340 and is connected to receiver plate 310 via bolt 360.

Item 370 of FIG. 3 is a sub-assembly that includes pillow block bearings, spacing plates, and bolts connected in a similar fashion as parts 340, 345, 350, 355, 360, and 365 discussed above. Note that the assembly allows receiver plate 310 to rotate relative to receiver plate 320, where side to side motion of the respective receiver plates may be limited or restricted. Item 380 of FIG. 3 may be a clamp that prevents receiver plates 310 and 320 from moving sideways along the length of tube or rod 330.

Each of the respective items used to fabricate item 370 of FIG. 3 are not numbered for clarity. While the FIG. 2 and FIG. 3 include four different pillow block bearings, a receiver plate assembly consistent with the present disclosure may be made with three pillow block bearings. For example, one pillow block bearing could be place in the center of a first receiver plate and two pillow block bearings could be placed at the ends of a second receiver plate.

Figure 4:
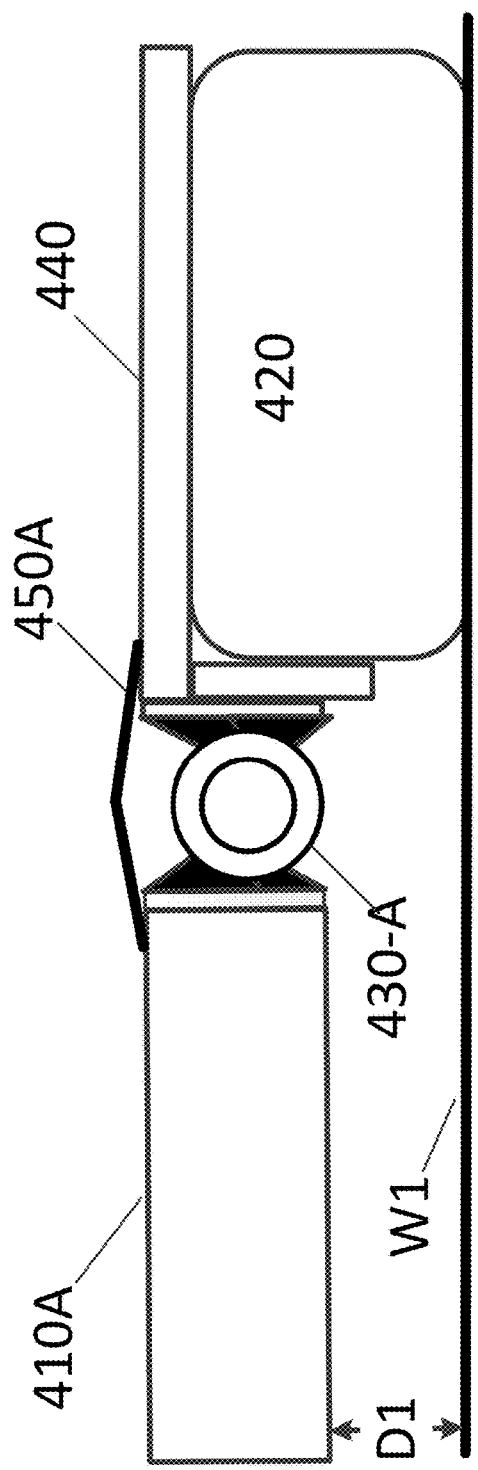
FIG. 4 illustrates a ramp and boat dock that are flexibly connected together using apparatus consistent with the present disclosure.
Figure 4:
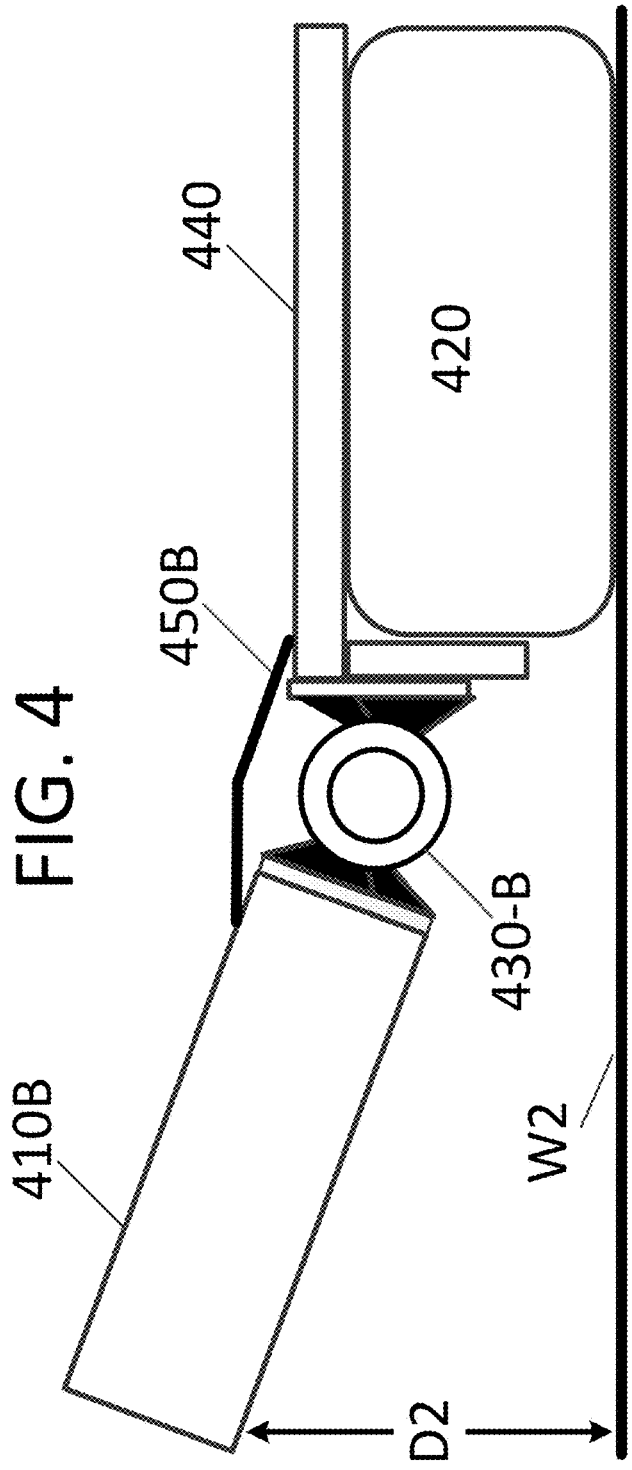

FIG. 4 illustrates a ramp and boat dock that are flexibly connected together using apparatus consistent with the present disclosure. FIG. 4 illustrates a ramp and boat dock when a water level of a waterway is first at a first a higher level and then is at a lower level. FIG. 4 includes two different images of a ramp 410 and a boat dock 420 when a water level varies from a higher water level W1 to a lower water level W2. Note that at each different water level, an angle of the ramp changes relative to a respective water level. At the higher water level W1 of FIG. 4, the ramp 410A is even with an upper surface 440 of boat dock 420 and at the lower water level, the angle of the ramp angles downward 410B. FIG. 4 also includes boat dock 420, cover plate 450 (or kick plate), and a receiver assembly 430 that connects the ramp 410 to dock 420. Item 440 identifies a top or walking surface of boat ramp 420. Cover plate 450 may be a piece of embossed stainless steel flexibly mounted between boat ramp 410 and an upper surface 440 of boat dock 420.

The top boat ramp/boat dock image of FIG. 4 illustrates ramp 410 in a first position 410A (higher water level W1). The bottom ramp/boat dock image of FIG. 4 illustrates ramp 410 in a second position 410B (lower water level W2). In an instance when the water level was to move to a level that is above water level W1, ramp 410 would be angled in an upward direction.

The top boat ramp/boat dock image of FIG. 4 illustrates cover plate 450 in a first position 450A. The top bottom ramp/boat dock image of FIG. 4 illustrates cover plate 450 in a second position 450B. The purpose of such a cover plate 450, when used, may be to cover an edge or gap that may form between a top surface of boat ramp 440 and a portion of a boat ramp 410 as water levels vary.

The top boat ramp/boat dock image of FIG. 4 shows receiver plate assembly 430 in a first position 430A. The bottom ramp/boat dock image of FIG. 4 shows receiver plate assembly 430 in a second position 430B. Note that angles of at least portions of the receiver plate assembly vary as water levels vary from level W1 to level W2. Items D1 and D2 illustrate a change in distances to the water level from a ground reference point located at the bottom left side of ramp 410. Note that distance D1 is much less than distance D2.

Methods consistent with the present disclosure may identify sizes and types of materials that scale with sizes or masses of particular boat ramps and boat docks. For example, either more pillow block bearings, or larger pillow block bearings and larger tubes/bars could be attached to ramps or docks of virtually any size or mass. Force calculations could be performed to estimate stresses that may be imparted upon a boat ramp/dock apparatus consistent with the present disclosure and appropriate materials may then be sourced and fabricated to meet virtually any need. Stress forces may be associated with an amount of instantaneous change in water level due to wave action or may be associated with forces associated with movement of water from tidal action or from water flow rates. Stress forces may also be associated with relative angles of a ramp and a dock at different water levels.

One exemplary set of part sizes to make a receiver plate assembly includes a boat dock receiver plate made of steel (e.g. stainless steel) that is 5 feet long, 10 inches wide, and 0.5 inches thick. Spacers/bearing rests may be welded to the boat dock receiver plate could measure 8 inches in length, 2 inches in width, and 0.5 inches in thickness. Pillow block bearing assembled that measure 7 inches in length, 2 inches in width, and 4 inches in height could be attached to the spacers and the boat dock receiver plate using 2.5 inch by 0.626 inch #8 bolts, washers, and nuts (or lock nuts). This set of parts may also include a ramp receiver plate that is 4 feet in length, 8 inches wide, and 0.5 inches thick. Here the same sized spacers, pillow block bearings, and hardware (bolts, washers, & nuts) could be used to attach the ramp receiver plate to respective pillow block bearings and spacers. In an instance with an inner diameter of the pillow bock bearing is 1.5 inches, a cold rolled piece of steel of about 1.5 inches in cross-section could be used to attach a boat dock receiver plate sub-assembly to a ramp receiver plate sub-assembly to make the receiver plate assembly.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed is:

1. An apparatus for coupling a ramp to a dock, the apparatus comprising:
   a first receiver plate;
   a first set of pillow block bearings that are rigidly coupled to the first receiver plate when a first receiver plate sub-assembly is formed;
   a second receiver plate;
   a second set of pillow block bearings that are rigidly coupled to the second receiver plate when a second receiver plate sub-assembly is formed; and
   an elongated bar shaped structure that flexibly connects the first and the second receiver plate sub-assemblies together based on the elongated bar shaped structure passing through the first set of pillow block bearings and the second set of pillow block bearings.

2. The apparatus of claim 1, wherein the elongated bar shaped structure has a round shape that fits through a round opening of each respective pillow block bearing of the first and the second set of pillow block bearings and the flexible connection connecting the first and the second receiver plate sub-assemblies together includes rotational motion perpendicular to a length of the elongated bar shaped structure.

3. The apparatus of claim 1, further comprising:
   a first set of spacing plates, wherein a respective pillow block bearing of the first set of pillow block bearings rests on a respective spacing plate of the first set of spacing plates; and
   a second set of spacing plates, wherein a respective pillow block bearing of the second set of pillow block bearings rests on a respective spacing plate of the second set of spacing plates.

4. The apparatus of claim 3, further comprising one or more clamping mechanisms attached to the elongated bar shaped structure that limit motion of both the first receiver plate sub-assembly and the second receiver plate sub-assembly in a direction parallel to a length of the elongated bar shaped structure.

5. The apparatus of claim 3, wherein the first set of spacing plates are welded to the first receiver plate and the second set of spacing plates are welded to the second receiver plate.

6. The apparatus of claim 1, further comprising flared edges at each of two ends of the elongated bar shaped structure.

7. The apparatus of claim 1, further comprising:
   a first attachment mechanism that attaches a first subassembly that includes the first receiver plate to the ramp; and
   a second attachment mechanism that attaches a second subassembly that includes the second receiver plate to the dock.

8. The apparatus of claim 1, wherein the first receiver plate sub-assembly is attached to the ramp and the second receiver plate sub-assembly is attached to the dock.

9. The apparatus of claim 8, wherein the elongated bar shaped structure rotates to allows the first receiver plate sub-assembly to move relative to the second receiver plate sub-assembly as a water level changes.

* * * * *